(12) United States Patent
Sidwell

(10) Patent No.: US 12,024,849 B2
(45) Date of Patent: Jul. 2, 2024

(54) SYSTEM AND METHODS FOR A UNIVERSAL, MOBILE BACKHOE SYSTEM

(71) Applicant: Workhorse ATV, LLC, Smartsville, CA (US)

(72) Inventor: Paul Sidwell, Smartsville, CA (US)

(73) Assignee: WORKHORSE ATV, LLC, Smartsville, CA (US)

(*) Notice: Subject to any disclaimer, the term of this patent is extended or adjusted under 35 U.S.C. 154(b) by 0 days.

(21) Appl. No.: 17/737,874

(22) Filed: May 5, 2022

(65) Prior Publication Data

US 2022/0356670 A1 Nov. 10, 2022

Related U.S. Application Data

(60) Provisional application No. 63/184,614, filed on May 5, 2021.

(51) Int. Cl.
| | | |
|---|---|---|
| *E02F 3/32* | (2006.01) | |
| *B62D 65/02* | (2006.01) | |
| *E02F 9/08* | (2006.01) | |
| *E02F 9/22* | (2006.01) | |

(52) U.S. Cl.
CPC .............. *E02F 3/325* (2013.01); *B62D 65/02* (2013.01); *E02F 9/085* (2013.01); *E02F 9/22* (2013.01)

(58) Field of Classification Search
None
See application file for complete search history.

(56) References Cited

U.S. PATENT DOCUMENTS

| | | | |
|---|---|---|---|
| 2,897,986 A | 8/1959 | Davis | |
| 4,648,780 A | 3/1987 | Harms | |
| 5,171,124 A | 12/1992 | Foster | |
| 5,511,813 A * | 4/1996 | Kravitz | B60D 1/42 |
| | | | 280/495 |
| 5,540,006 A * | 7/1996 | Lloyd | E02F 3/384 |
| | | | 37/403 |
| 5,809,779 A * | 9/1998 | Bruso | E02F 9/0866 |
| | | | 60/458 |
| 7,036,606 B2 | 5/2006 | Rossi | |
| 7,752,780 B2 | 7/2010 | Johnson | |
| 2002/0028125 A1 | 3/2002 | Belzile | |
| 2008/0000652 A1 | 1/2008 | Johnson | |
| 2009/0014488 A1 | 1/2009 | Ayers | |
| 2010/0277584 A1 * | 11/2010 | Price | F16M 11/18 |
| | | | 248/422 |
| 2014/0123524 A1 | 5/2014 | Ayers | |
| 2015/0259873 A1 * | 9/2015 | Rosec | E02F 9/085 |
| | | | 414/687 |

* cited by examiner

*Primary Examiner* — Michael S Lowe
(74) *Attorney, Agent, or Firm* — Inventive Law Inc.; Jim H Salter

(57) ABSTRACT

A universal, mobile, backhoe system integrated with a vehicle and related methods are disclosed. An example embodiment includes: a boom; an arm coupled to the boom; an implement coupled to the arm; a swing mount coupled to the boom, the swing mount including a pivot point; a truck mount removably coupled to the swing mount; stabilizer legs coupled to the truck mount, the truck mount further including a mounting bracket removably coupled thereto and configured to be removably attached to a hitch receiver of a vehicle, the truck mount further including mounting shafts removably coupled thereto and configured to be removably attached to at least two points of a bed of the truck.

18 Claims, 17 Drawing Sheets

```
Method for Providing a Universal, Mobile Backhoe System
                    -1000-
                       │
                       ▼
           Couple a boom to an arm.
                    -1010-
                       │
                       ▼
        Couple an implement to the arm.
                    -1020-
                       │
                       ▼
  Couple a swing mount to the boom, the swing mount including a pivot
                       point.
                    -1030-
                       │
                       ▼
    Removably couple a truck mount to the swing mount.
                    -1040-
                       │
                       ▼
       Couple stabilizer legs to the truck mount.
                    -1050-
                       │
                       ▼
    Removably couple a mounting bracket to the truck mount.
                    -1060-
                       │
                       ▼
  Removably couple the mounting bracket to a hitch receiver of a vehicle.
                    -1070-
                       │
                       ▼
    Removably couple mounting shafts to the truck mount.
                    -1080-
                       │
                       ▼
  Removably couple the mounting shafts to at least two points of a bed of
                       the truck.
                    -1090-
                       │
                       ▼
                     ( End )
```

Fig. 17

SYSTEM AND METHODS FOR A UNIVERSAL, MOBILE BACKHOE SYSTEM

PRIORITY PATENT APPLICATION

This non-provisional patent application draws priority from U.S. provisional patent application Ser. No. 63/184, 614; filed May 5, 2021. This present non-provisional patent application draws priority from the referenced patent application. The entire disclosure of the referenced patent application is considered part of the disclosure of the present application and is hereby incorporated by reference herein in its entirety.

COPYRIGHT

A portion of the disclosure of this patent document contains material that is subject to copyright protection. The copyright owner has no objection to the facsimile reproduction of the patent document or the patent disclosure, as it appears in the U.S. Patent and Trademark Office patent files or records, but otherwise reserves all copyright rights whatsoever. The following notice applies to the disclosure provided herein and to the drawings that form a part of this document: Copyright 2021-2022, Workhorse ATV, LLC; All Rights Reserved.

TECHNICAL FIELD

The disclosed subject matter relates to mechanical backhoe systems. In particular, the present disclosure relates to a universal, mobile backhoe system integrated with a vehicle and related methods.

BACKGROUND

Several conventional systems have tried to implement a backhoe mounting system in the bed of a pickup truck. For example, U.S. Pat. No. 2,897,986 describes an apparatus for mounting a mechanical shovel on the bed of a truck, which will provide a sturdy support for the mechanical shovel when in the working position, and will also provide a better means for transporting the mechanical shovel from location to location. U.S. Pat. No. 4,648,780 describes a truck mounted backhoe supported by a frame that pivots between a use position and a transport position in an uninterrupted movement. U.S. Patent Pub. No. US20140123524 describes a backhoe assembly for securement to a common road vehicle, such as a pickup truck. However, none of these solutions provide a universal, mobile, backhoe system integrated with a vehicle and related methods wherein the disclosed system and methods can be implemented without damage or modification of the truck and with usage of the standard components and hitch mechanisms of a standard pickup truck, tractor, Utility Task Vehicle (UTV), All-Terrain Vehicle (ATV), and the like.

SUMMARY

A universal, mobile, backhoe system integrated with a vehicle and related methods are disclosed. According to various example embodiments, the universal, mobile, backhoe system of the present technology is universal because the system is compatible with all vehicles. For example, the universal, mobile, backhoe system of the present technology is mobile because of integration and with any vehicle such as a pick-up truck, a tractor, Utility Task Vehicles (UTVs), All-Terrain Vehicles (ATVs), and the like. The example embodiments disclosed herein show a pick-up truck although the present technology may be used with any vehicle with a hitch receiver.

According to various example embodiments, the universal, mobile, backhoe system of the present technology is mobile; because, the system is compatible with all vehicles and may be transported by any of the vehicles. For example, the universal, mobile, backhoe system of the present technology is transportable by any vehicle a (e.g., pick-up truck, a tractor, a UTV, ATV, and the like).

In various embodiments, the power source of the universal, mobile, backhoe system of the present technology is a hydrocarbon fuel (e.g., gasoline) powered engine that powers the hydraulic system of the backhoe and further may be used to charge a battery of the system.

In some embodiments, the power source of the universal, mobile, backhoe system of the present technology is an electric battery powering the hydraulic system of the backhoe. In some instances, the electric system is charged with a solar battery so a user may keep the batteries of the system charged even when the system is in the field. The multiple power sources enable a user to use many different sources of power to keep getting work done. For example, a user may continually keep the batteries charged for continual work using solar power when using the universal, mobile, backhoe system of the present technology is located away for a plug or is out of fuel (e.g., gasoline). Furthermore, the user may plug the battery into a 12-volt outlet when using the universal, mobile, backhoe system of the present technology when near an electrical outlet (i.e., near a house).

The universal, mobile, backhoe system of the present technology includes an attachment system including a quick-connect mechanism. For example, the quick-connect mechanism connects/integrates with a backhoe, a trencher, a forklift, and a post hole digger/auger allowing for many different uses. The various example embodiments are described in more detail below.

BRIEF DESCRIPTION OF THE DRAWINGS

Embodiments are illustrated by way of example and not limitation in the figures of the accompanying drawings, in which:

FIG. 17 illustrates a method according to and enabled by the structures and techniques disclosed herein.

DETAILED DESCRIPTION

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

Figure 1:
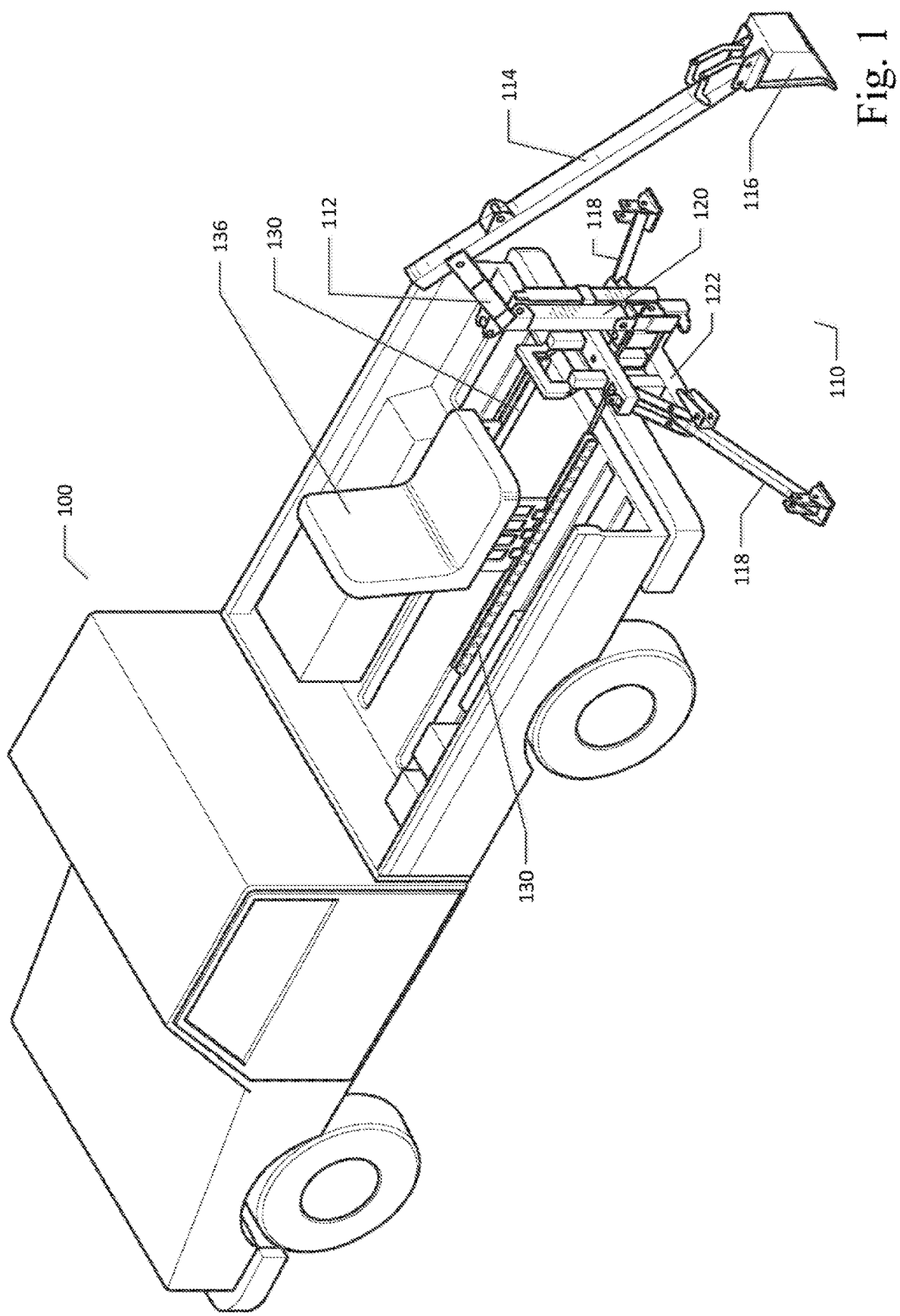
FIG. 1 illustrates a perspective view of a universal, mobile backhoe system integrated with a vehicle, according to an example embodiment.

In various example embodiments, a universal, mobile, backhoe system integrated with a vehicle is disclosed. Referring to FIG. 1, the diagram illustrates a perspective view of a universal, mobile backhoe system 110 integrated with a vehicle 100, according to an example embodiment. In the example embodiment shown, a mobile backhoe system 110 can include a boom 112, an arm 114, a bucket (or other implement or tool) 116, stabilizer/outrigger legs 118, a swing mount 120, and a truck mount 122. In an example embodiment, the bucket (or other implement or tool, e.g., trencher, forklift, post hole digger/auger, etc.) 116 is coupled to the arm 114, which is coupled to the boom 112. The boom 112 is further coupled to the swing mount 120, which is removably coupled to the truck mount 122. The swing mount 120 is coupled to the truck mount 122 in a manner to enable sideways rotation or lateral swing movement of the boom 112 and arm 114 about the pivot point 124, while the truck mount 122 remains in stationary connection to the rear of the truck 100. The example embodiment shown further provides stabilizer/outrigger legs 118 coupled to the truck mount 122 to provide stability for the backhoe 110 and truck 100.

In an example embodiment, the backhoe system further includes mounting rails 130, which can be attached to the bed of the pickup truck 100. In contrast to most conventional truck-mounted backhoe systems, the backhoe system of the presently disclosed system enables installation of the mounting rails 130 in the bed of truck 100 using the same bolts provided by the truck manufacturer for mounting the truck bed to the truck frame. These standard truck bed-mounting bolts can be readily removed and the mounting rails 130 can be placed on top of the truck bed and lined up with the bolt holes already provided in the truck bed. The standard truck bed-mounting bolts can be secured into the truck bed bolt holes capturing the mounting rails 130 therebetween and thereby coupling the mounting rails 130 into the bed of truck 100. As will be described in more detail below, the mounting rails 130 can be used to provide two of the three mounting points for removably coupling the backhoe system of an example embodiment to the rear end of the truck 100.

Figure 2:
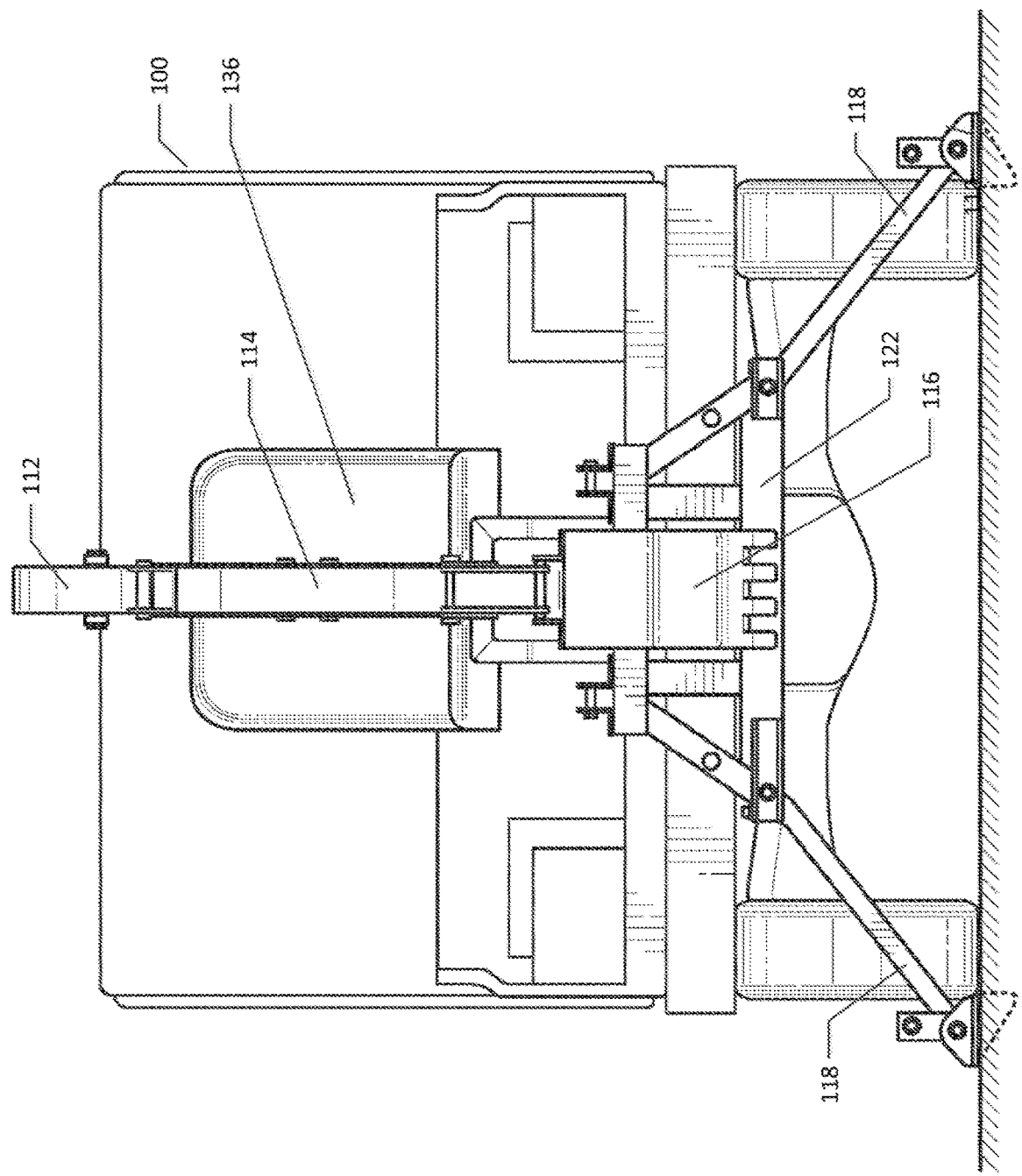
FIG. 2 illustrates a rear view of a universal, mobile backhoe system integrated with a vehicle, according to an example embodiment.
Figure 3:
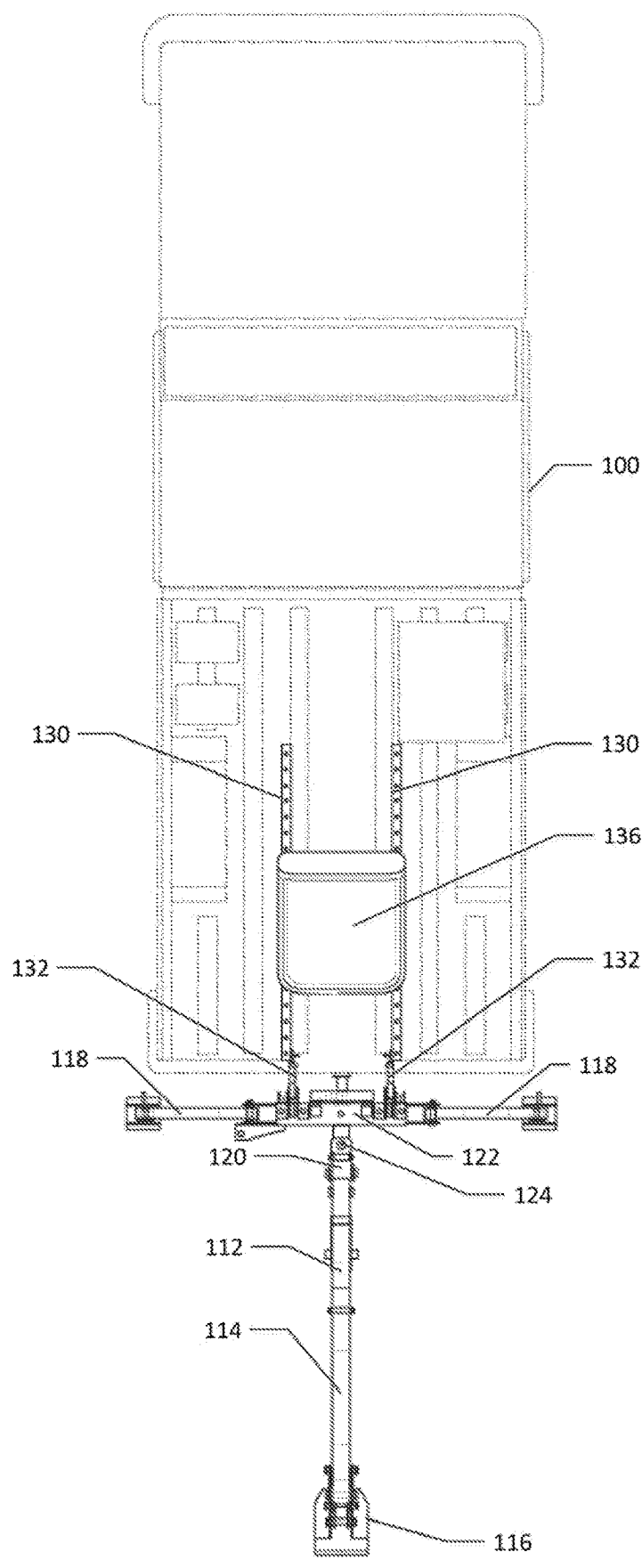
FIG. 3 illustrates a top view of a universal, mobile backhoe system integrated with a vehicle, according to an example embodiment.

FIG. 2 illustrates a rear view of a universal, mobile backhoe system integrated with a vehicle, according to an example embodiment. FIG. 3 illustrates a top view of a universal, mobile backhoe system integrated with a vehicle, according to an example embodiment. FIG. 3 further illustrates the mounting shafts 132, which can be coupled to the mounting rails 130 installed in the bed of truck 100 as described above. As will be described in more detail below, the mounting rails 130 and the mounting shafts 132 can be used to provide two of the three mounting points for removably coupling the backhoe system of an example embodiment to the rear end of the truck 100. A backhoe operator chair or seat 136 can also be coupled to the mounting rails 130.

Figure 4:
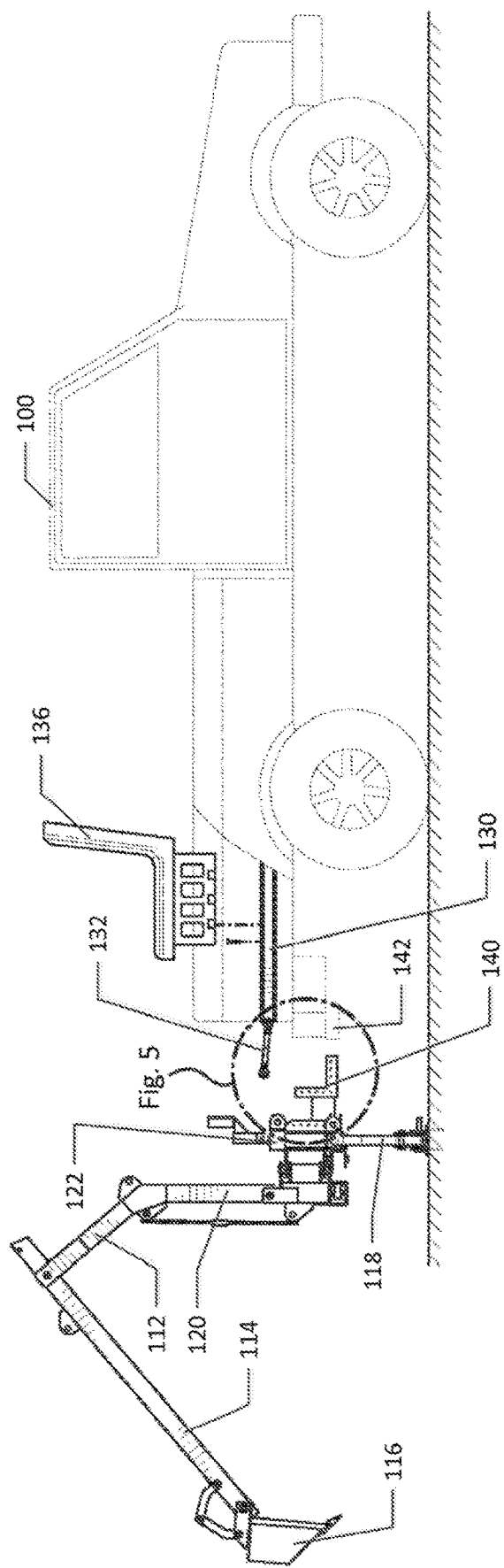
FIG. 4 illustrates a side view of a universal, mobile backhoe system integrated with a vehicle, according to an example embodiment.

FIG. 4 illustrates a side view of a universal, mobile backhoe system integrated with a vehicle, according to an example embodiment. FIG. 4 further illustrates the mounting shafts 132, which can be coupled to the mounting rails 130 installed in the bed of truck 100 as described above. Additionally, an L-shaped mounting bracket 140 can be provided as part of the universal, mobile backhoe system. The L-shaped mounting bracket 140 of an example embodiment is configured to attach to the truck mount 122 in a recessed portion of the truck mount 122. Coupling holes in the mounting bracket 140 and the recessed portion of the truck mount 122 can be aligned and a truck mount mounting pin 144 can be inserted and secured to couple the L-shaped mounting bracket 140 to the truck mount 122. Various different holes in the mounting bracket 140 and the recessed portion of the truck mount 122 can be provided to configure the mobile backhoe system for different types or sizes of trucks or different hitch receiver positions.

Figure 5:
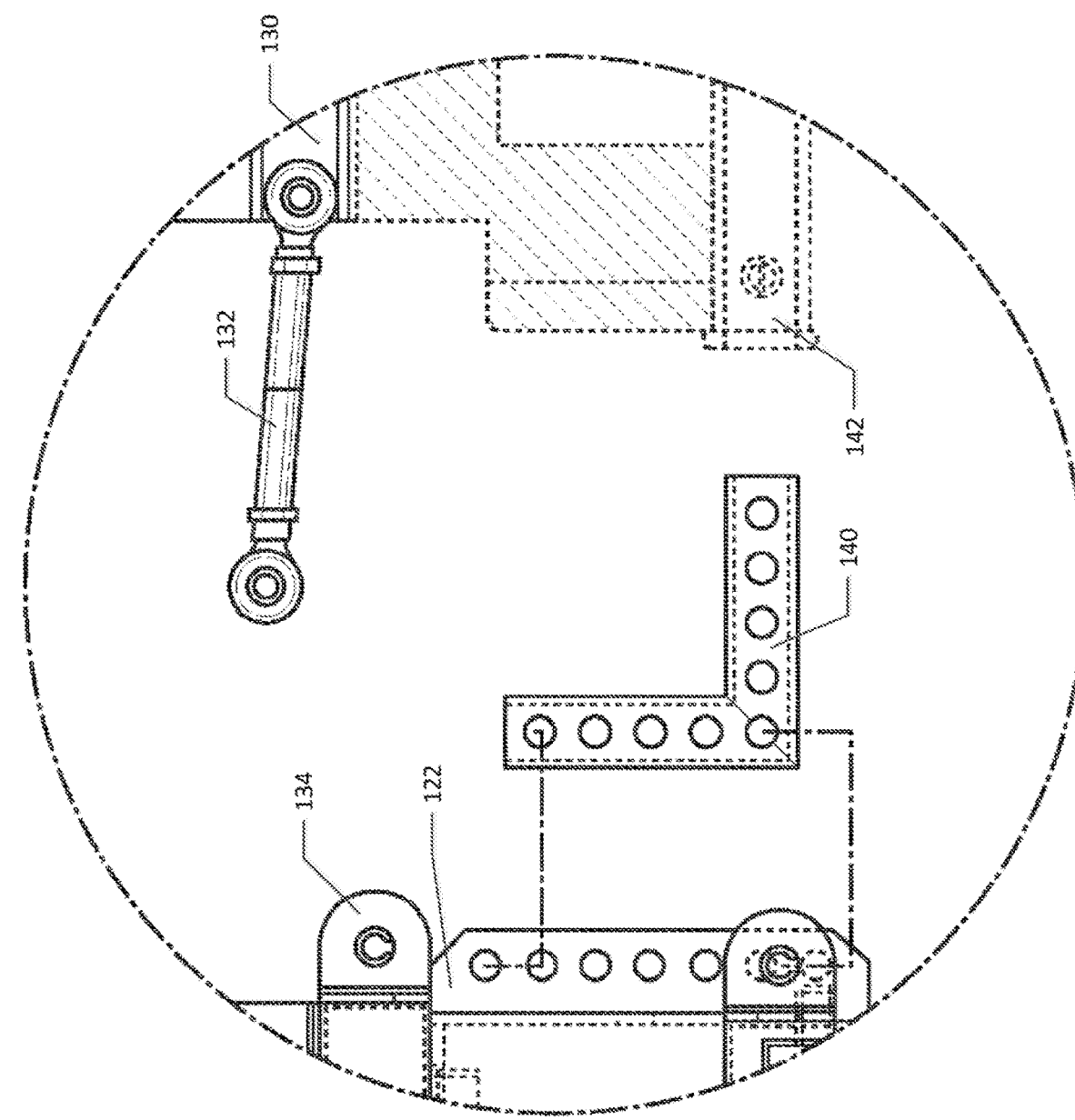
FIG. 5 illustrates a close-up view of an integration connection of a universal, mobile backhoe system with a vehicle, according to an example embodiment.

FIG. 5 illustrates a close-up view of an integration connection of a universal, mobile backhoe system with a vehicle, according to an example embodiment. As shown in FIG. 5, the L-shaped mounting bracket 140 of an example embodiment is configured to attach to the truck mount 122 in a recessed portion of the truck mount 122. Coupling holes in the mounting bracket 140 and the recessed portion of the truck mount 122 can be aligned and a truck mount mounting pin 144 can be inserted and secured to couple the L-shaped mounting bracket 140 to the truck mount 122. Once the L-shaped mounting bracket 140 is coupled to the truck mount 122, the L-shaped mounting bracket 140 can be inserted into a hitch receiver 142 of the truck 100. A hitch receiver mounting pin can be inserted and secured to couple the L-shaped mounting bracket 140 to the hitch receiver 142 of the truck 100. As a result, the truck mount 122 and universal, mobile backhoe system coupled thereto can be removably connected to the rear end of truck 100 via the hitch receiver 142. The connection of the L-shaped mounting bracket 140 to the hitch receiver 142 represents the third connection point of the mobile backhoe system in removable coupling to the truck 100.

As also shown in FIG. 5, ends of the mounting shafts 132 can be coupled to the mounting rails 130 installed in the bed of truck 100. Opposite ends of the mounting shafts 132 can be removably coupled to mounting shaft receiving eyes 134, which are integrated with the truck mount 122. The mounting shafts 132 can be removably coupled to the mounting shaft receiving eyes 134 with pins or bolts. As a result, the truck mount 122 and universal, mobile backhoe system coupled thereto can be removably connected to the rear end of truck 100 via the mounting shafts 132 coupled to the mounting rails 130 installed in the bed of truck 100. The connection of the mounting shafts 132 with the mounting shaft receiving eyes 134 represents the first and second connection points of the mobile backhoe system in removable coupling to the truck 100. Thus, the mobile backhoe system of an example embodiment can be removably coupled to the truck 100 at three different points to provide a secure, stable, and convenient coupling of the mobile backhoe system to the truck 100.

In an alternative embodiment, the holes in the side walls of the truck 100, which are standard on most conventional trucks, can be used to secure the ends of the mounting shafts 132 to the truck 100. This configuration can be used as an alternative to securing the mounting shafts 132 to the mounting rails 130 installed in the bed of truck 100 as described above. In the alternative embodiment, eye bolts or the equivalent can be inserted into each of the two rearmost or forward holes in the side walls of the truck 100. Such eye bolts or the equivalent for insertion and securement to a truck side wall hole are commonly available. Once the eye bolts or the equivalent are secured to the side wall holes of the truck, ends of the mounting shafts 132 can be attached and secured to the eye bolts or the equivalent coupled to the side wall holes. The mounting shafts 132 can be coupled to the side wall hole eye bolts or the equivalent with pins or bolts. As a result, the connection of the mounting shafts 132 at one end with the eye bolts or the equivalent coupled to the side wall holes, and at an opposite end with the mounting shaft receiving eyes 134 represents an alternative embodiment for the first and second connection points of the mobile backhoe system in removable coupling to the truck 100. This alternative embodiment enables the mobile backhoe system to be secured to the truck 100 without the need to install mounting rails 130 into the bed of truck 100.

Figure 6:
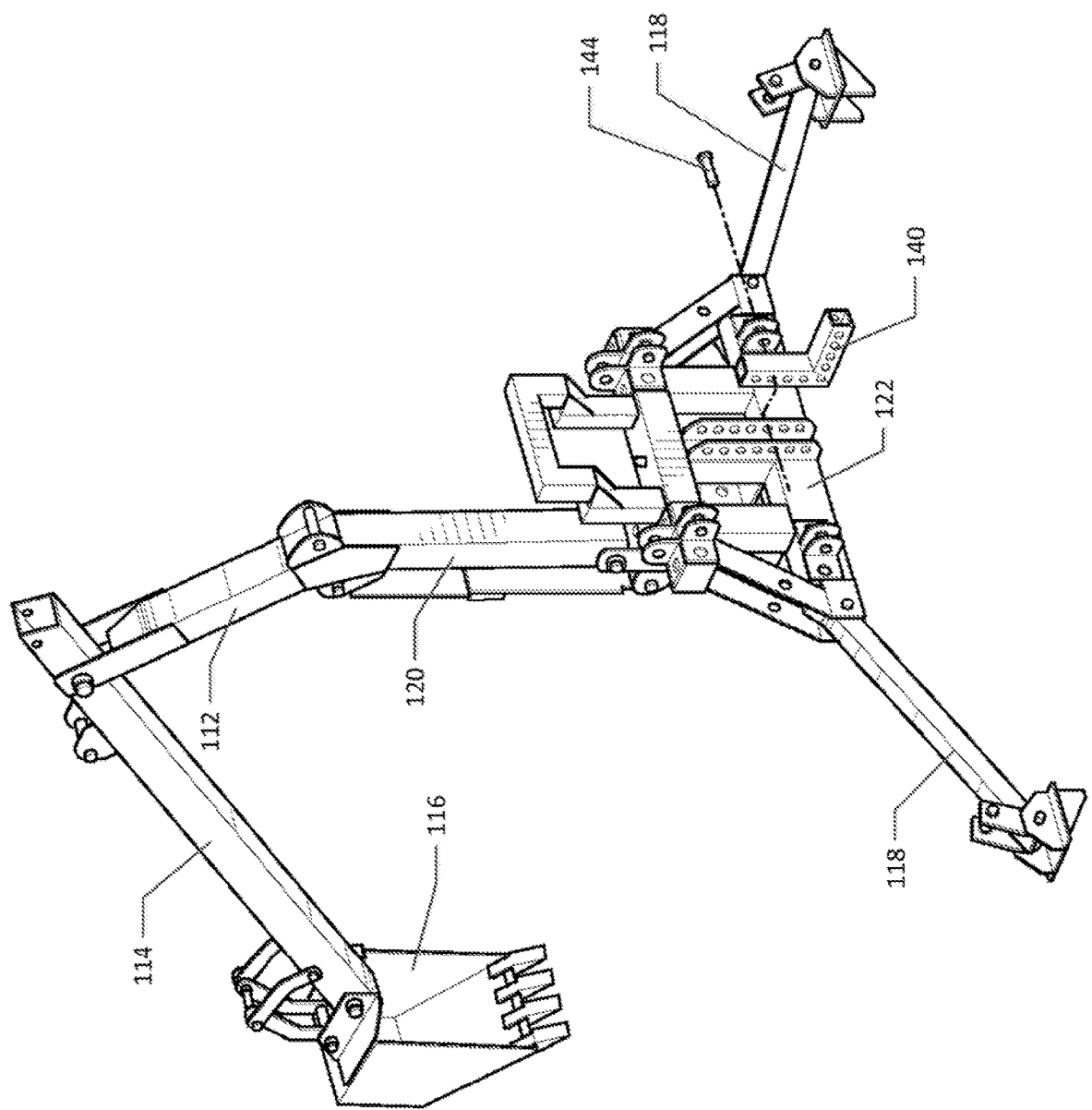
FIG. 6 illustrates a perspective view of a universal, mobile backhoe system, according to an example embodiment.

FIG. 6 illustrates a perspective view of a universal, mobile backhoe system, according to an example embodiment. As shown, the L-shaped mounting bracket 140 can be coupled to the truck mount 122. Once the L-shaped mounting bracket 140 is coupled to the truck mount 122, an end of the L-shaped mounting bracket 140 can be inserted into a hitch receiver 142 of the truck 100 and secured to the hitch receiver 142 with a pin. As a result, the truck mount 122 and universal, mobile backhoe system coupled thereto can be removably connected to the rear end of truck 100 via the hitch receiver 142. The connection of the L-shaped mounting bracket 140 to the hitch receiver 142 represents the third connection point of the mobile backhoe system in removable coupling to the truck 100.

Figure 7:
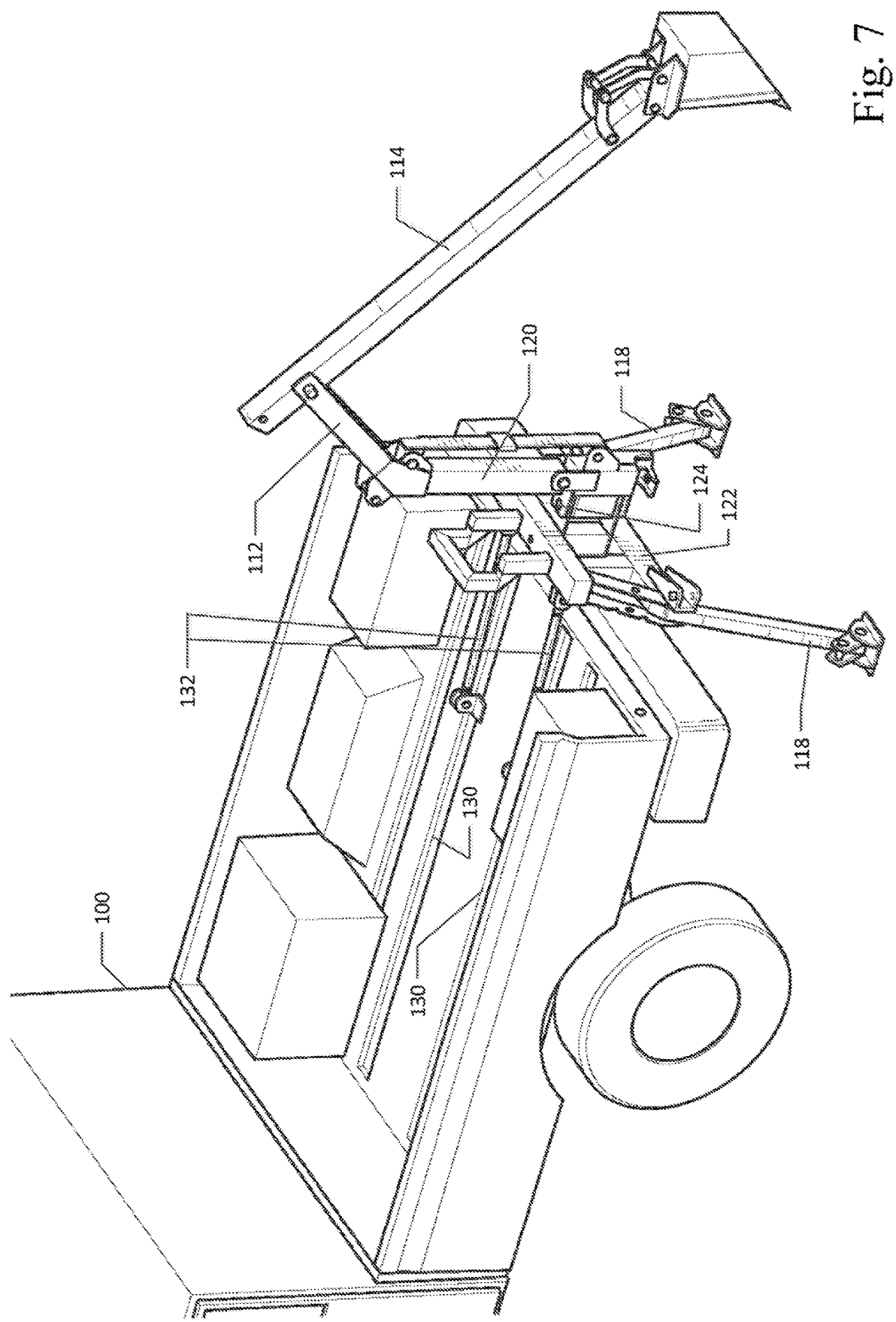
FIGS. 7 and 8 illustrate additional perspective views of a universal, mobile backhoe system integrated with a vehicle, according to an example embodiment.
Figure 8:
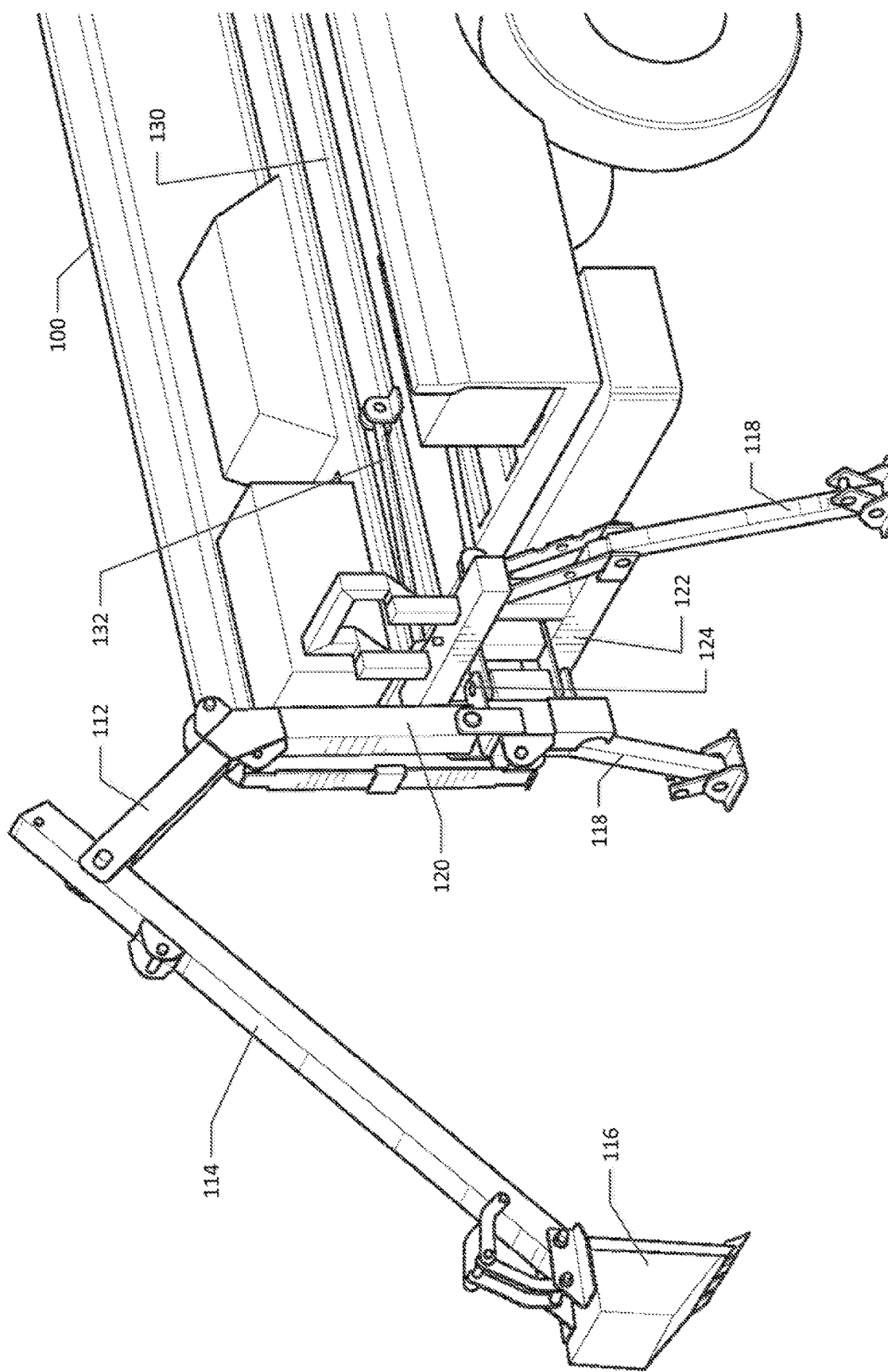

FIGS. 7 and 8 illustrate additional perspective views of a universal, mobile backhoe system integrated with a vehicle, according to an example embodiment. As shown, the mounting shafts 132 can be coupled to the mounting rails 130 installed in the bed of truck 100 as described above. The mounting rails 130 and the mounting shafts 132 can be used to provide two of the three mounting points for removably coupling the backhoe system of an example embodiment to the rear end of the truck 100.

Figure 9:
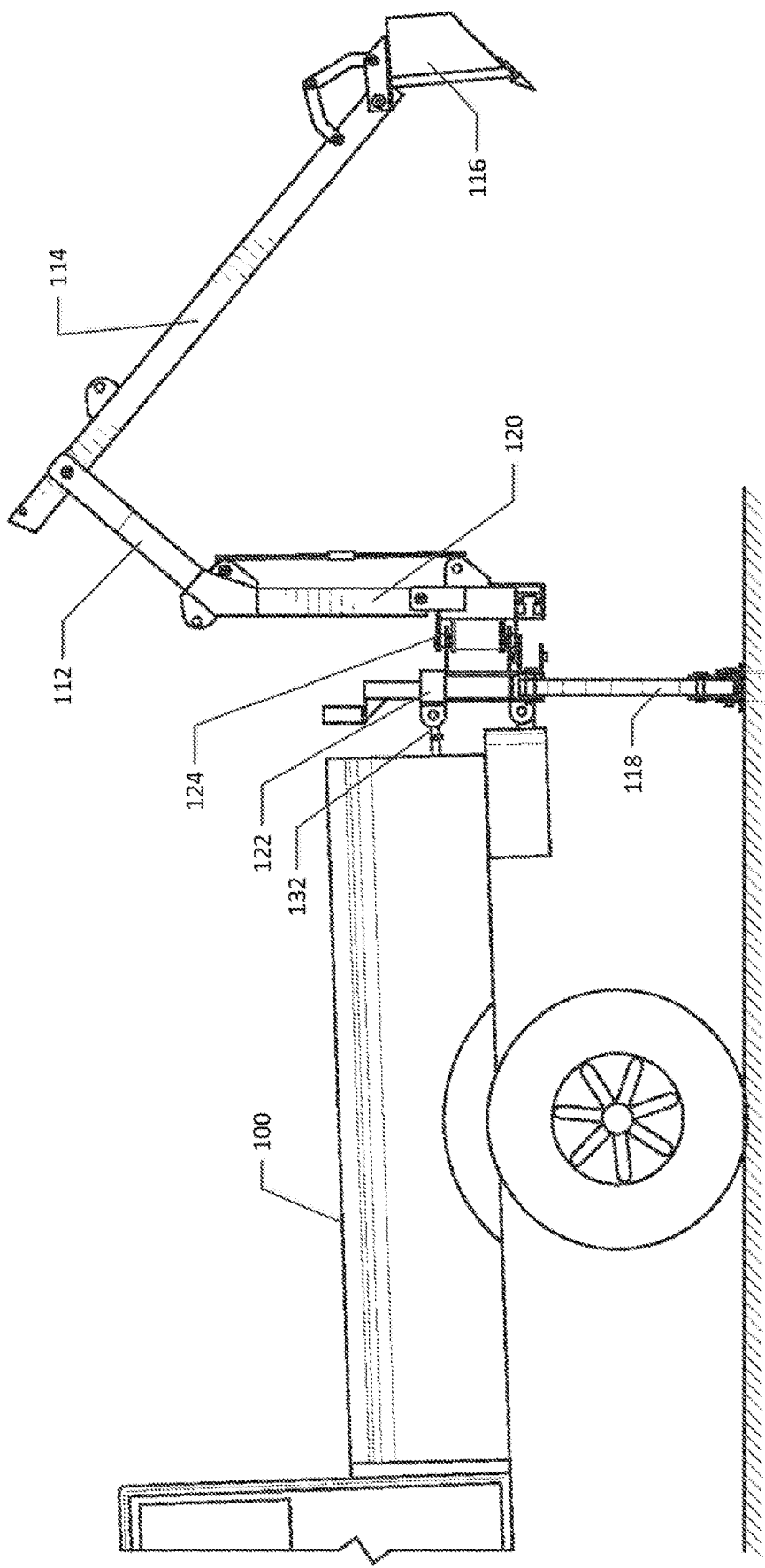
FIG. 9 illustrates another side view of a universal, mobile backhoe system integrated with a vehicle, according to an example embodiment.
Figure 10:
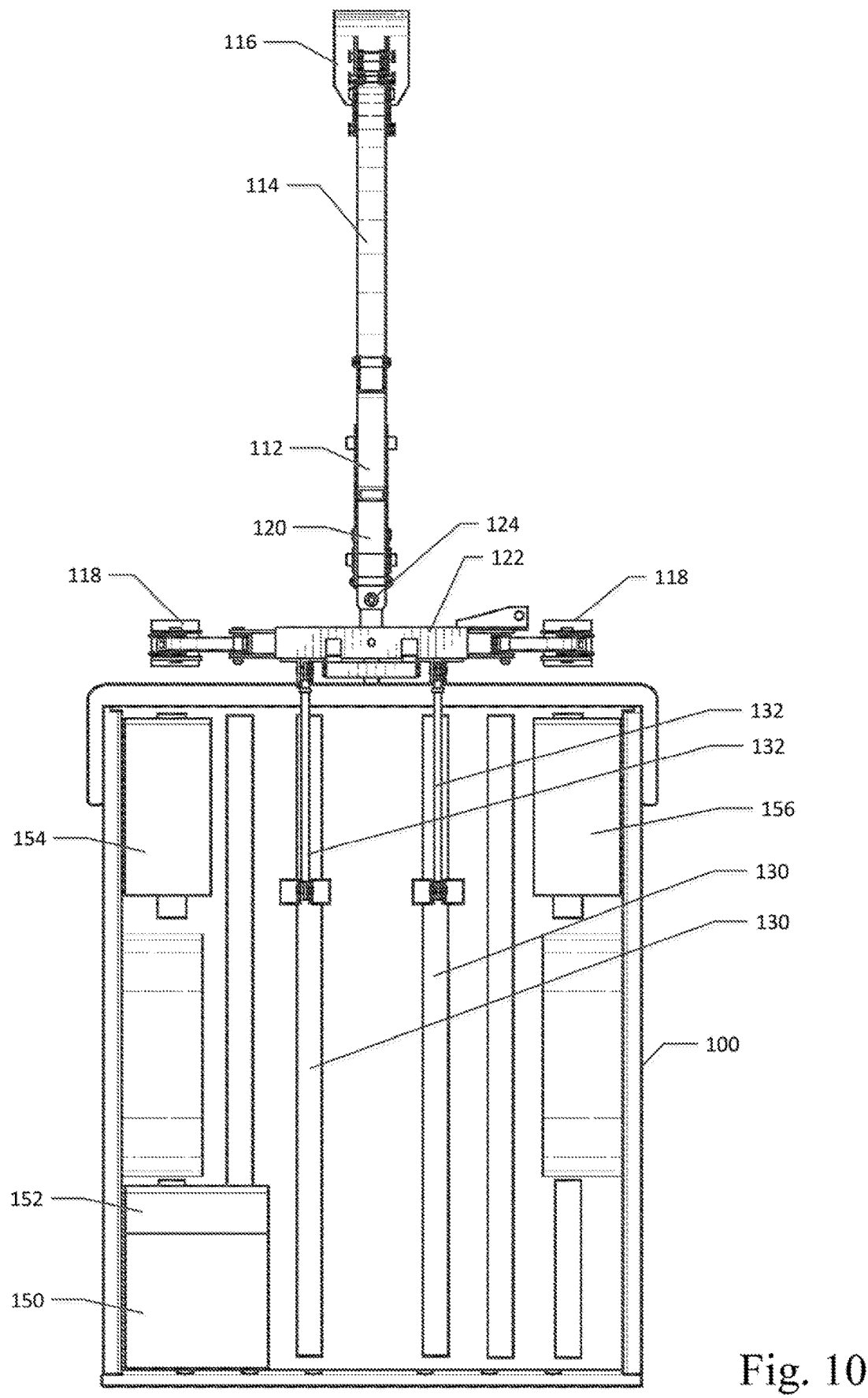
FIG. 10 illustrates another top view of a universal, mobile backhoe system integrated with a vehicle, according to an example embodiment.

FIG. 9 illustrates another side view of a universal, mobile backhoe system integrated with a vehicle, according to an example embodiment. FIG. 10 illustrates another top view of a universal, mobile backhoe system integrated with a vehicle, according to an example embodiment. As shown, the mounting shafts 132 can be coupled to the mounting rails 130 installed in the bed of truck 100 as described above.

Figure 11:
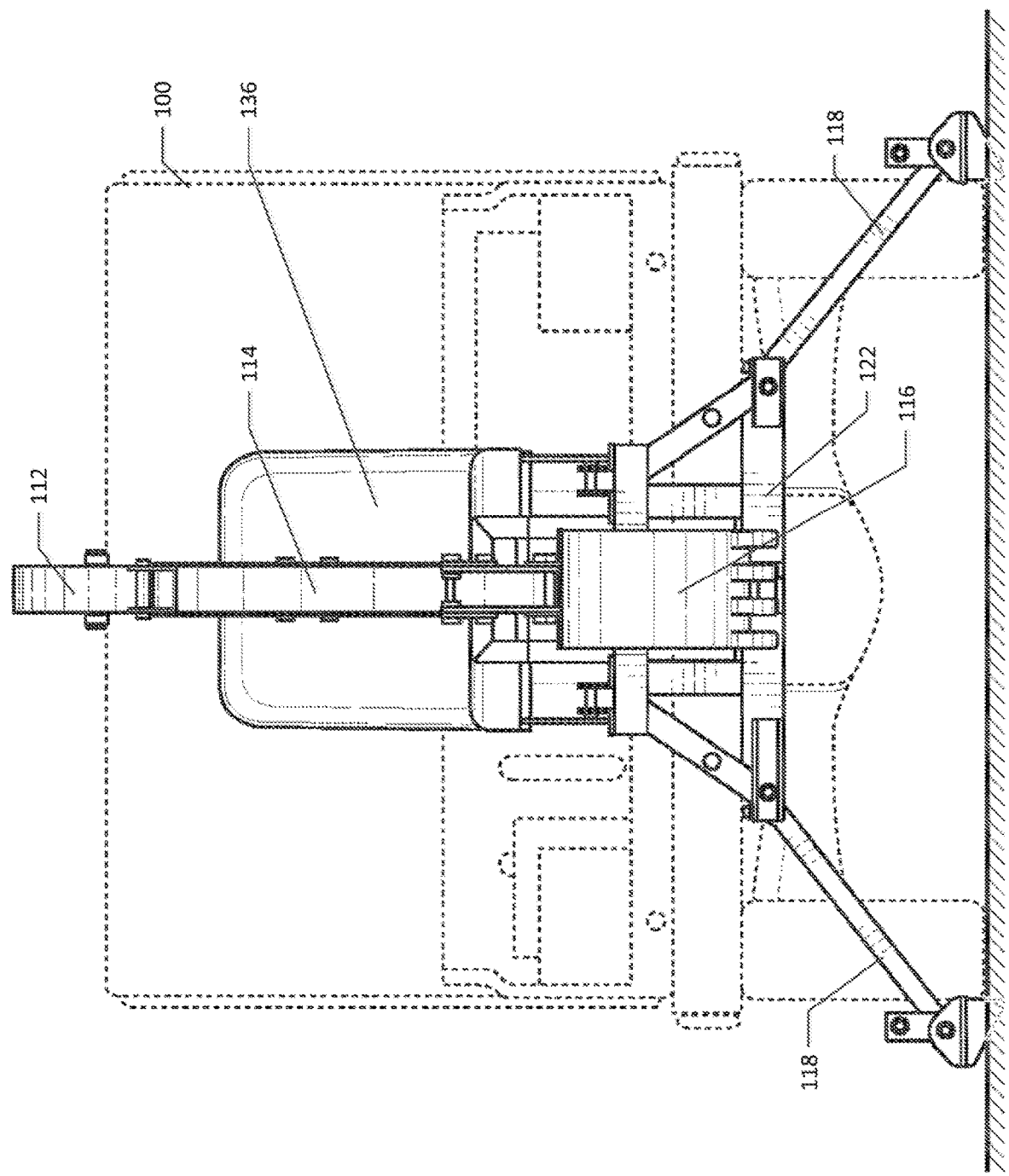
FIG. 11 illustrates another rear view of a universal, mobile backhoe system integrated with a vehicle, according to an example embodiment.

FIG. 11 illustrates another rear view of a universal, mobile backhoe system integrated with a vehicle, according to an example embodiment.

Figure 12:
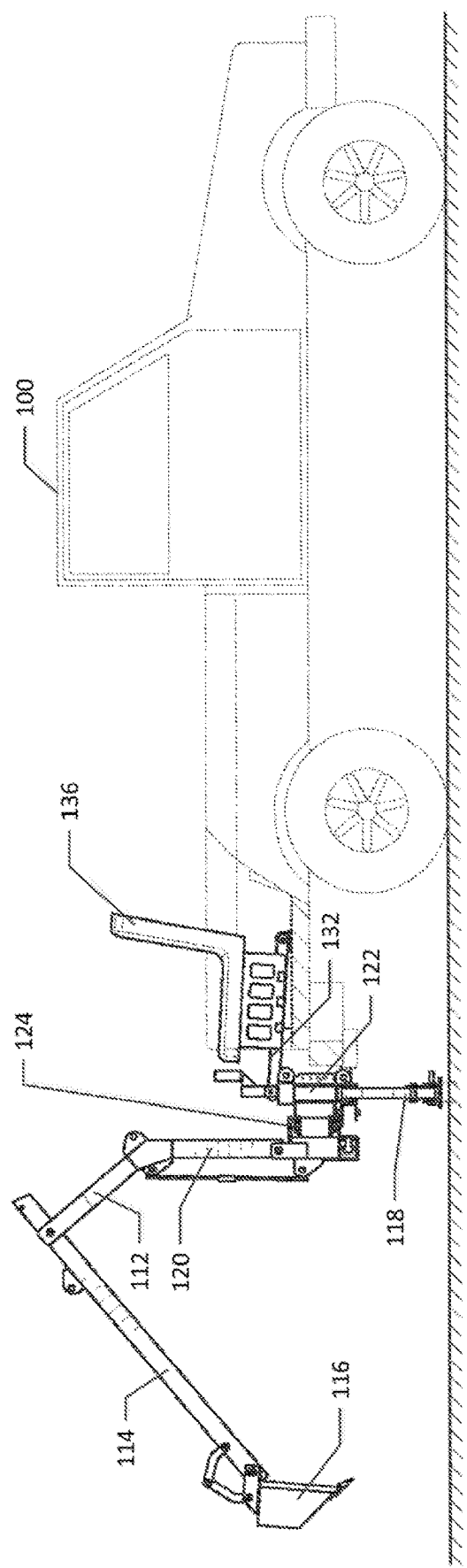
FIG. 12 illustrates another side view of a universal, mobile backhoe system integrated with a vehicle and showing an installed operator seat, according to an example embodiment.

FIG. 12 illustrates another side view of a universal, mobile backhoe system integrated with a vehicle and showing an installed operator chair or seat 136, according to an example embodiment. As shown, an alternative embodiment enables the backhoe operator chair or seat 136 to be attached and secured to the mounting shafts 132, which are coupled to the mounting rails 130 secured to the bed of the truck 100.

Figure 13:
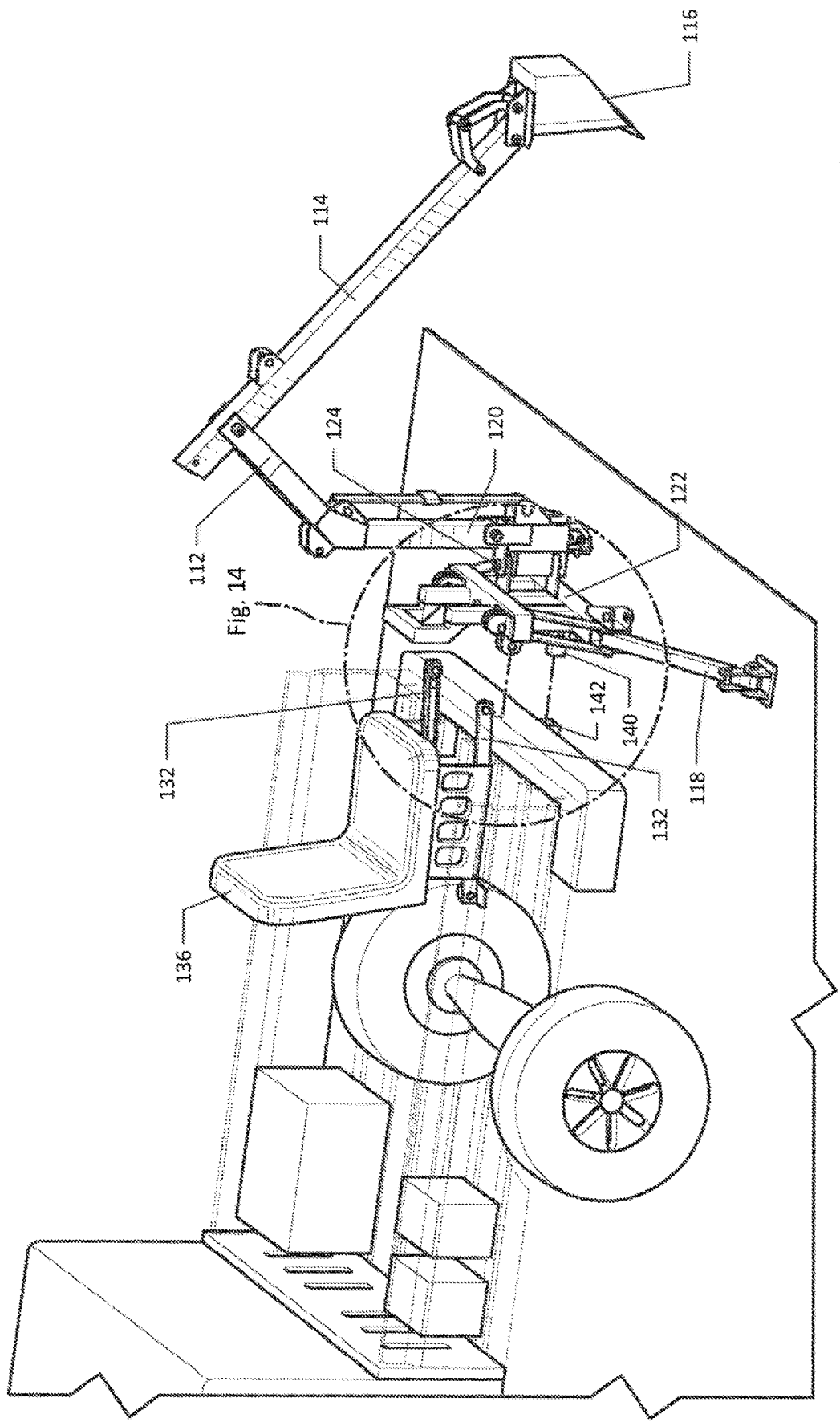
FIG. 13 illustrates another perspective view of a universal, mobile backhoe system integrated with a vehicle and showing the integration connection points, according to an example embodiment.
Figure 14:
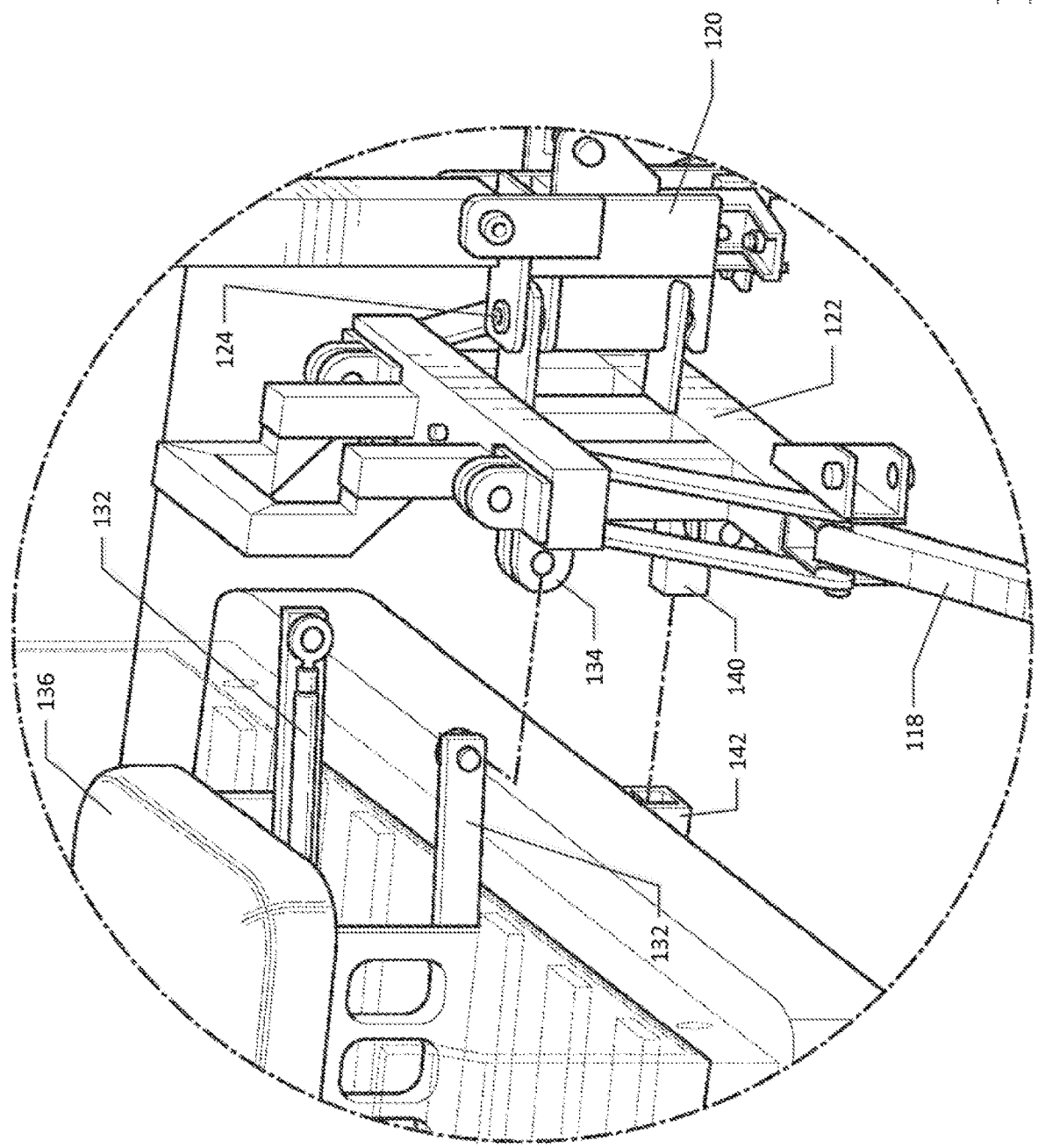
FIG. 14 illustrates a close-up view of another integration connection of a universal, mobile backhoe system with a vehicle, according to an example embodiment.

FIG. 13 illustrates another perspective view of a universal, mobile backhoe system integrated with a vehicle and showing the integration connection points, according to an example embodiment. FIG. 14 illustrates a close-up view of another integration connection of a universal, mobile backhoe system with a vehicle, according to an example embodiment. As shown, the mounting shafts 132 can be coupled to the mounting rails 130 installed in the bed of truck 100 as described above. Opposite ends of the mounting shafts 132 can be removably coupled to mounting shaft receiving eyes 134, which are integrated with the truck mount 122. Thus, the mounting rails 130 and the mounting shafts 132 can be used to provide two of the three mounting points for removably coupling the backhoe system of an example embodiment to the rear end of the truck 100. Additionally, the L-shaped mounting bracket 140 of an example embodiment is configured to attach to the truck mount 122 in a recessed portion of the truck mount 122. Once the L-shaped mounting bracket 140 is coupled to the truck mount 122, the L-shaped mounting bracket 140 can be inserted into a hitch receiver 142 of the truck 100 and locked in place with a pin. As a result, the truck mount 122 and universal, mobile backhoe system coupled thereto can be removably connected to the rear end of truck 100 via the hitch receiver 142. The connection of the L-shaped mounting bracket 140 to the hitch receiver 142 represents the third connection point of the mobile backhoe system in removable coupling to the truck 100.

Referring again to FIG. 10, the mobile backhoe system of an example embodiment can also include a power generation source 150 for the backhoe, a hydraulic pump 152, a hydraulic fluid reservoir 154, and a power storage device 156. In an example embodiment, the power generation source 150 can be a small gas-powered portable engine of a horse power rating sufficient to drive the hydraulic pump 152 with enough force to power each of the hydraulic cylinders coupled to the boom 112, the arm 114, and the bucket 116. A truck bed mounted hydraulic fluid reservoir 154 is provided to serve as the hydraulic fluid source enabling the hydraulic pump 152 to drive the backhoe hydraulic cylinders. A power storage device 156 (e.g., battery) can also be provided to retain electric energy produced by a generator driven by the power generation source 150. The stored electric energy can be used to drive a starter for the power generation source 150 and for other electrical switches or indicators provided on the mobile backhoe system of the example embodiment.

In another example embodiment, the power generation source 150 can be implemented as an electric motor driven by stored electric energy from the power storage device 156, or from electricity provided via an extension cord connected to an external electrical outlet or a separate portable power generator. In each case, the power generation source 150 implemented as an electric motor can be used to drive the hydraulic pump 152, which can drive the backhoe hydraulic cylinders.

In yet another example embodiment, the power generation source 150 can be implemented as an electric motor driven by stored electric energy from the power storage device 156, which can be charged via solar panels mounted on the truck 100 or separately. The example embodiment can also use portable solar panels, which can be set up on site to gather electric energy for storage in the power storage device 156.

Figure 15:
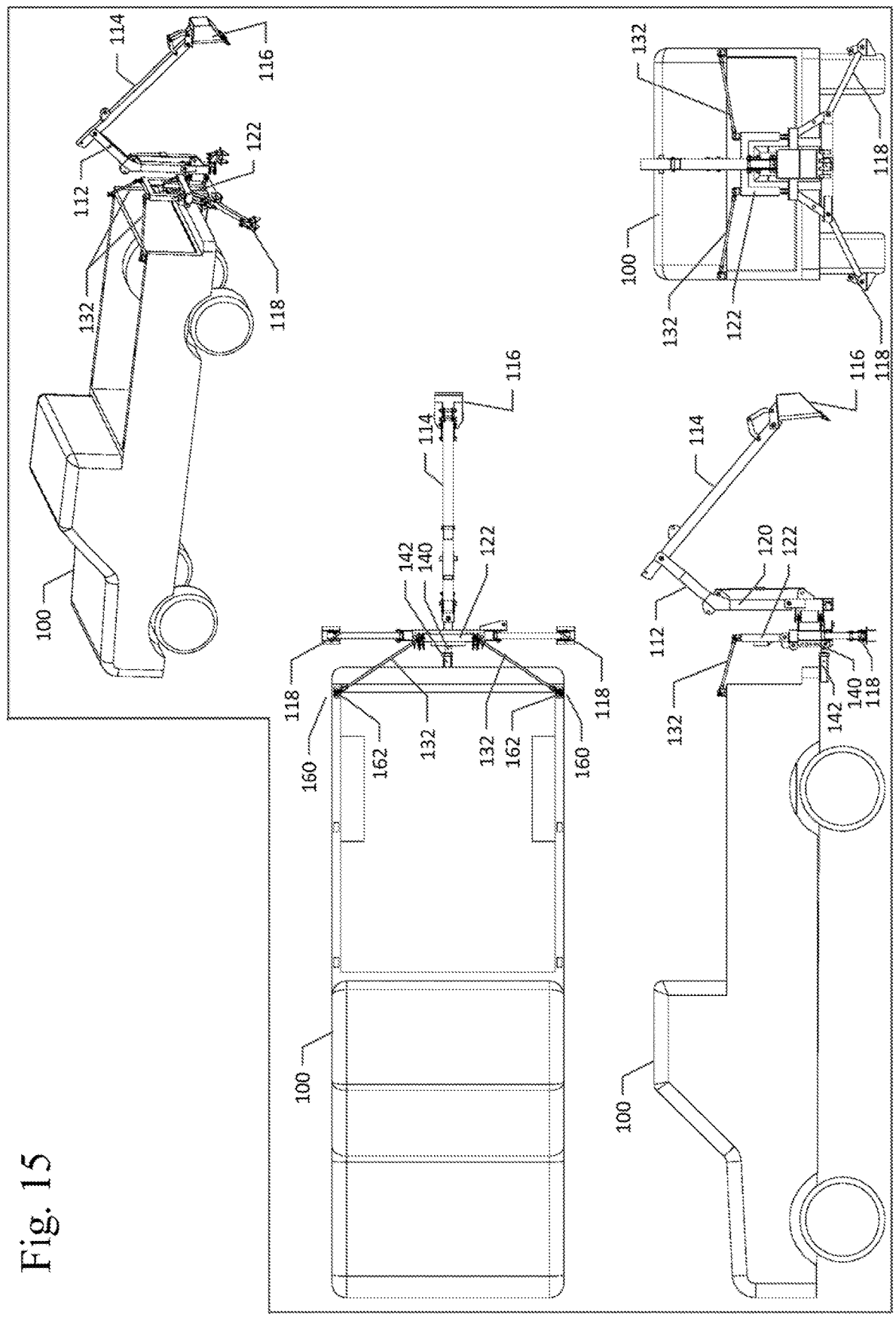
FIGS. 15 and 16 illustrate an example embodiment of the universal, mobile backhoe system integrated with a truck using holes in the side walls of the truck.
Figure 16:
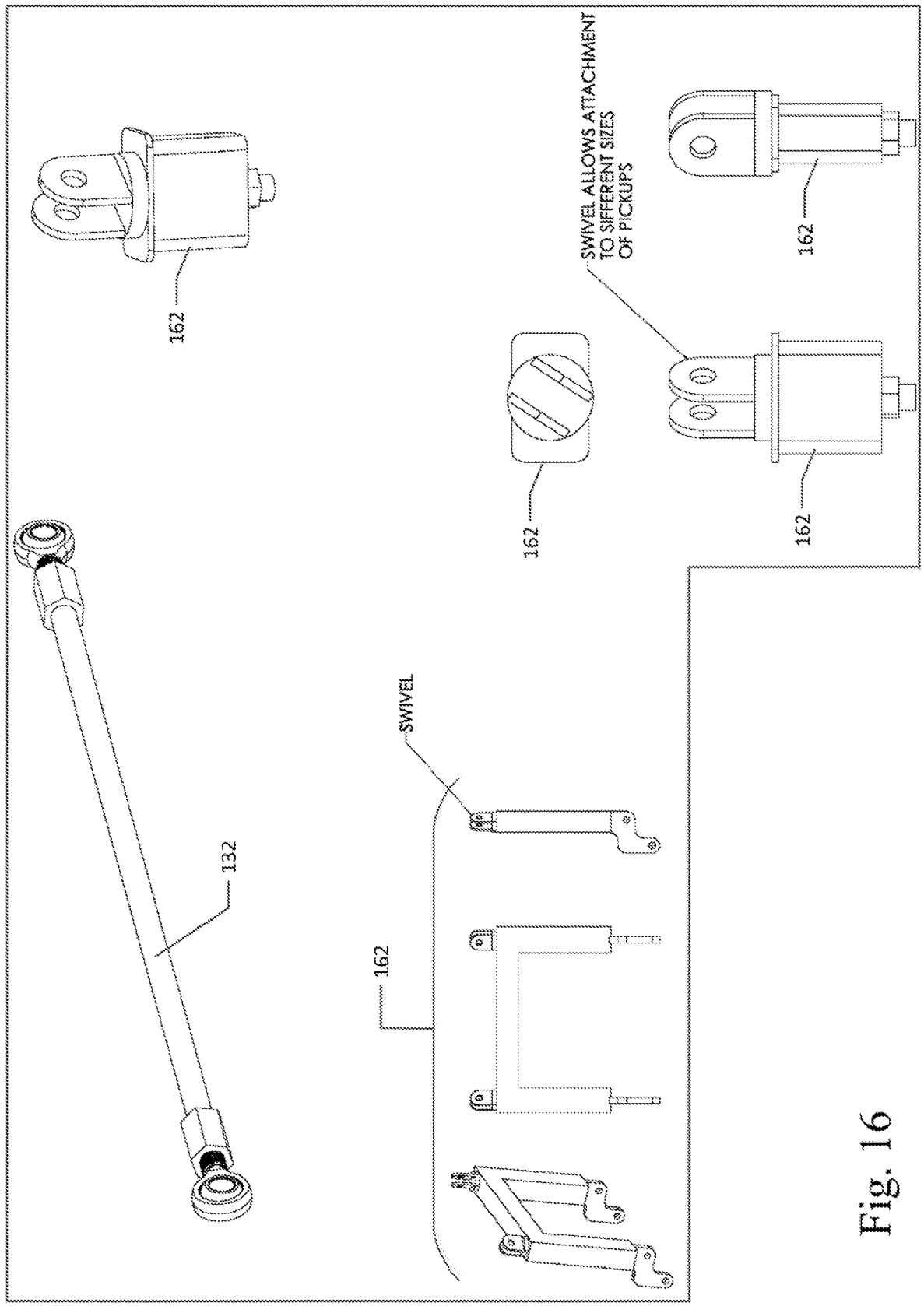

FIGS. 15 and 16 illustrate an example embodiment of the universal, mobile backhoe system integrated with a truck using holes 160 in the side walls of the truck 100. In this embodiment, the holes 160 in the side walls of the truck 100, which are standard on most conventional trucks, can be used to secure the ends of the mounting shafts 132 to the truck 100. This configuration can be used as an alternative to securing the mounting shafts 132 to the mounting rails 130 installed in the bed of truck 100 as described above. In this embodiment, side wall hole brackets 162 can be inserted into each of the two rearmost or forward holes 160 in the side walls of the truck 100. Example embodiments of these side wall hole brackets 162 for insertion and securement to a truck side wall hole 160 are shown in FIG. 16. In the example embodiments shown, the side wall hole brackets 162 can be fabricated with a lower end configured to fit into and secure to holes 160 in the side walls of the truck 100. Threaded lower ends of the side wall hole brackets 162 can be used to secure the side wall hole brackets 162 to the holes 160 in the side walls of the truck 100. In the example embodiments shown in FIG. 16, the side wall hole brackets 162 can be fabricated with an upper end configured with an eye or the equivalent to receive and secure an end of the mounting shafts 132. In an example embodiment, the upper ends of the side wall hole brackets 162 can be configured to swivel or rotate to accommodate different sizes and configurations of trucks 100. In an example embodiment, the ends of the mounting shafts 132 can also be configured to swivel or rotate.

Once the side wall hole brackets 162 are secured to the side wall holes 160 of the truck 100, ends of the mounting shafts 132 can be attached and secured to the side wall hole brackets 162 coupled to the side wall holes 160. The mounting shafts 132 can be removably coupled to the side wall hole brackets 162 with pins or bolts. As a result, the connection of the mounting shafts 132 at one end with the side wall hole brackets 162 coupled to the side wall holes 160, and at an opposite end with the mounting shaft receiving eyes 134 represents an alternative embodiment for the first and second connection points of the mobile backhoe system in removable coupling to the truck 100. This alternative embodiment enables the mobile backhoe system to be secured to the truck 100 without the need to install mounting rails 130 into the bed of truck 100.

FIG. 17 illustrates a method according to and enabled by the structures and techniques disclosed herein. In an example embodiment, the method 1000 includes: coupling a boom to an arm (operation 1010); coupling an implement to the arm (operation 1020); coupling a swing mount to the boom, the swing mount including a pivot point (operation 1030); removably coupling a truck mount to the swing mount (operation 1040); coupling stabilizer legs to the truck mount (operation 1050); removably coupling a mounting bracket to the truck mount (operation 1060); removably coupling the mounting bracket to a hitch receiver of a vehicle (operation 1070); removably coupling mounting shafts to the truck mount (operation 1080); and removably coupling the mounting shafts to at least two points of a bed of the truck (operation 1090).

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used only for descriptive purposes and not to be construed as limiting. The elements, materials, geometries, dimensions, and sequence of operations may all be varied for particular applications. Parts of some embodiments may be included in, or substituted for, those of other embodiments. While the foregoing examples of dimensions and ranges are considered typical, the various embodiments are not limited to such dimensions or ranges.

The Abstract is provided to allow the reader to quickly ascertain the nature and gist of the technical disclosure. The Abstract is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

As described herein, a universal, mobile, backhoe system integrated with a vehicle and related methods are disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

What is claimed is:

1. A universal, mobile, backhoe system integrated with a vehicle, the backhoe system comprising:
   a boom;
   an arm coupled to the boom;
   an implement coupled to the arm;
   a swing mount coupled to the boom, the swing mount including a pivot point;
   a truck mount removably coupled to the swing mount;
   stabilizer legs coupled to the truck mount, the truck mount further including a mounting bracket removably coupled thereto and configured to be removably attached to a hitch receiver of a vehicle, the truck mount further including mounting shafts removably coupled thereto and removably attached to at least two points at existing holes in side walls of the vehicle; and wall hole brackets inserted into the holes in the side walls of the vehicle, the mounting shafts being removably coupled to the wall hole brackets.

2. The backhoe system of claim 1 wherein the wall hole brackets are configured to swivel or rotate.

3. The backhoe system of claim 1 wherein the wall hole brackets are configured with threaded lower ends to secure the wall hole brackets to the holes in the side walls of the vehicle.

4. The backhoe system of claim 1 wherein the mounting bracket is an L-shaped mounting bracket configured to attach to the truck mount in a recessed portion of the truck mount.

5. The backhoe system of claim 1 wherein the mounting bracket includes a plurality of holes to enable adjustment of the mounting bracket for different types or sizes of trucks or different hitch receiver positions.

6. The backhoe system of claim 1 wherein the truck mount is removably coupled to at least three points on the vehicle.

7. The backhoe system of claim 1 wherein the boom is configured to swing laterally about the pivot point.

8. The backhoe system of claim 1 further including a backhoe operator chair removably coupled to a bed of the vehicle.

9. The backhoe system of claim 1 further including a power generation source, a hydraulic pump, and a hydraulic fluid reservoir, wherein the power generation source is coupled to the hydraulic pump and the hydraulic pump is coupled to the hydraulic fluid reservoir, the hydraulic pump driving the boom, the arm, and the implement.

10. The backhoe system of claim 9 wherein the power generation source, the hydraulic pump, and the hydraulic fluid reservoir are positioned in a bed of the vehicle.

11. The backhoe system of claim 9 wherein the power generation source is a gas-powered engine.

12. The backhoe system of claim 9 wherein the power generation source is an electric motor.

13. The backhoe system of claim 12 wherein the electric motor is driven by stored electric energy from a power storage device.

14. The backhoe system of claim 1 further including a power storage device.

15. A method comprising:
coupling a boom to an arm;
coupling an implement to the arm;
coupling a swing mount to the boom, the swing mount including a pivot point;
removably coupling a truck mount to the swing mount;
coupling stabilizer legs to the truck mount;
removably coupling a mounting bracket to the truck mount;
removably coupling the mounting bracket to a hitch receiver of a vehicle;
removably coupling mounting shafts to the truck mount; and
removably coupling the mounting shafts to at least two points at existing holes in side walls of the vehicle and inserting wall hole brackets into the holes in the side walls of the vehicle, and removably coupling the mounting shafts to the wall hole brackets.

16. The method of claim 15 wherein the wall hole brackets are configured with threaded lower ends to secure the wall hole brackets to the holes in the side walls of the vehicle.

17. The method of claim 15 further including installing a power generation source in a bed of the vehicle, coupling the power generation source to a hydraulic pump, coupling the hydraulic pump a hydraulic fluid reservoir, and causing the hydraulic pump to drive the boom, the arm, and the implement.

18. The method of claim 17 wherein the power generation source is a gas engine or an electric motor.

* * * * *